Feb. 3, 1959 T. W. KENYON 2,871,699
INDICATING INSTRUMENT FOR HELICOPTERS OR THE LIKE
Filed Feb. 21, 1956 7 Sheets-Sheet 3

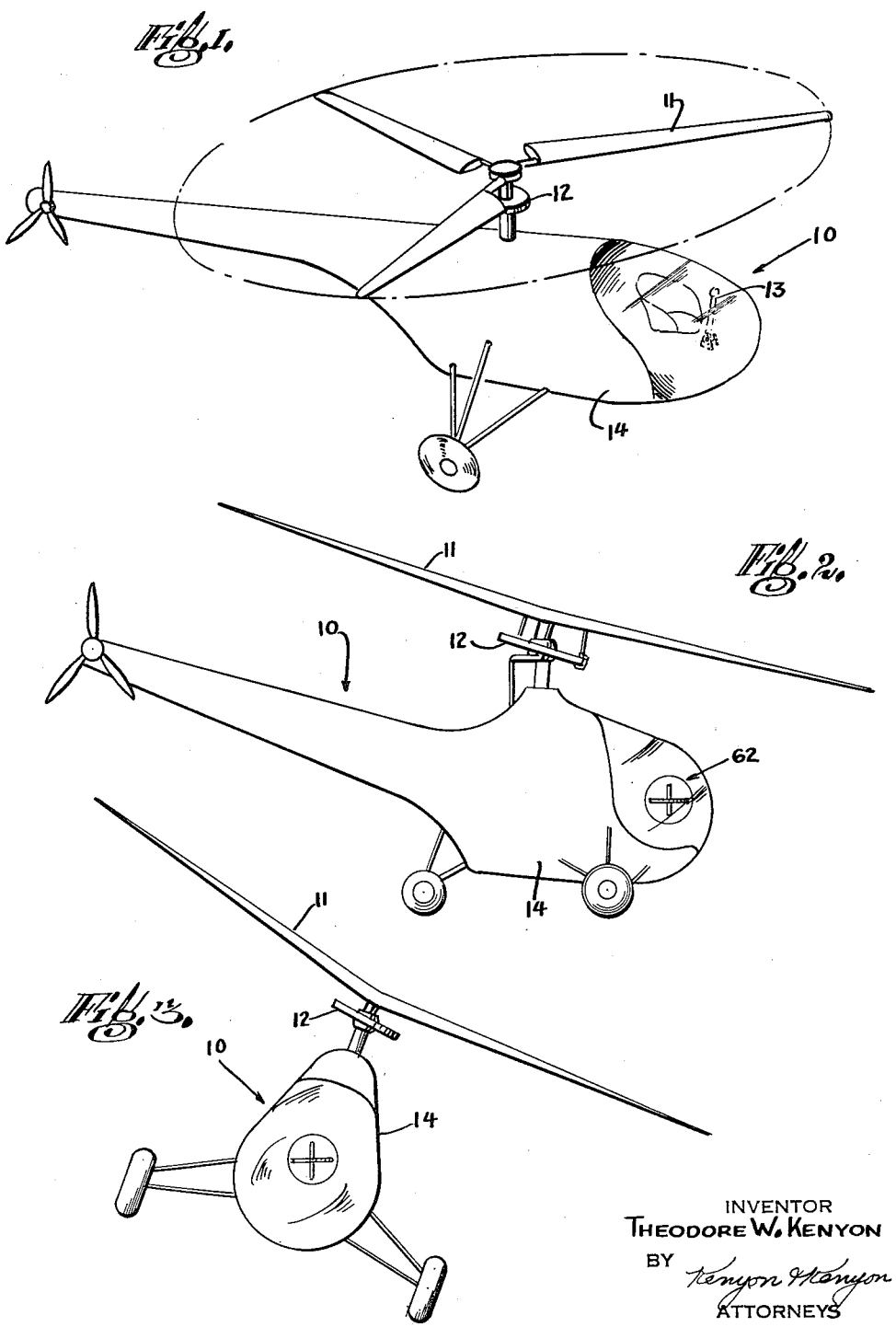

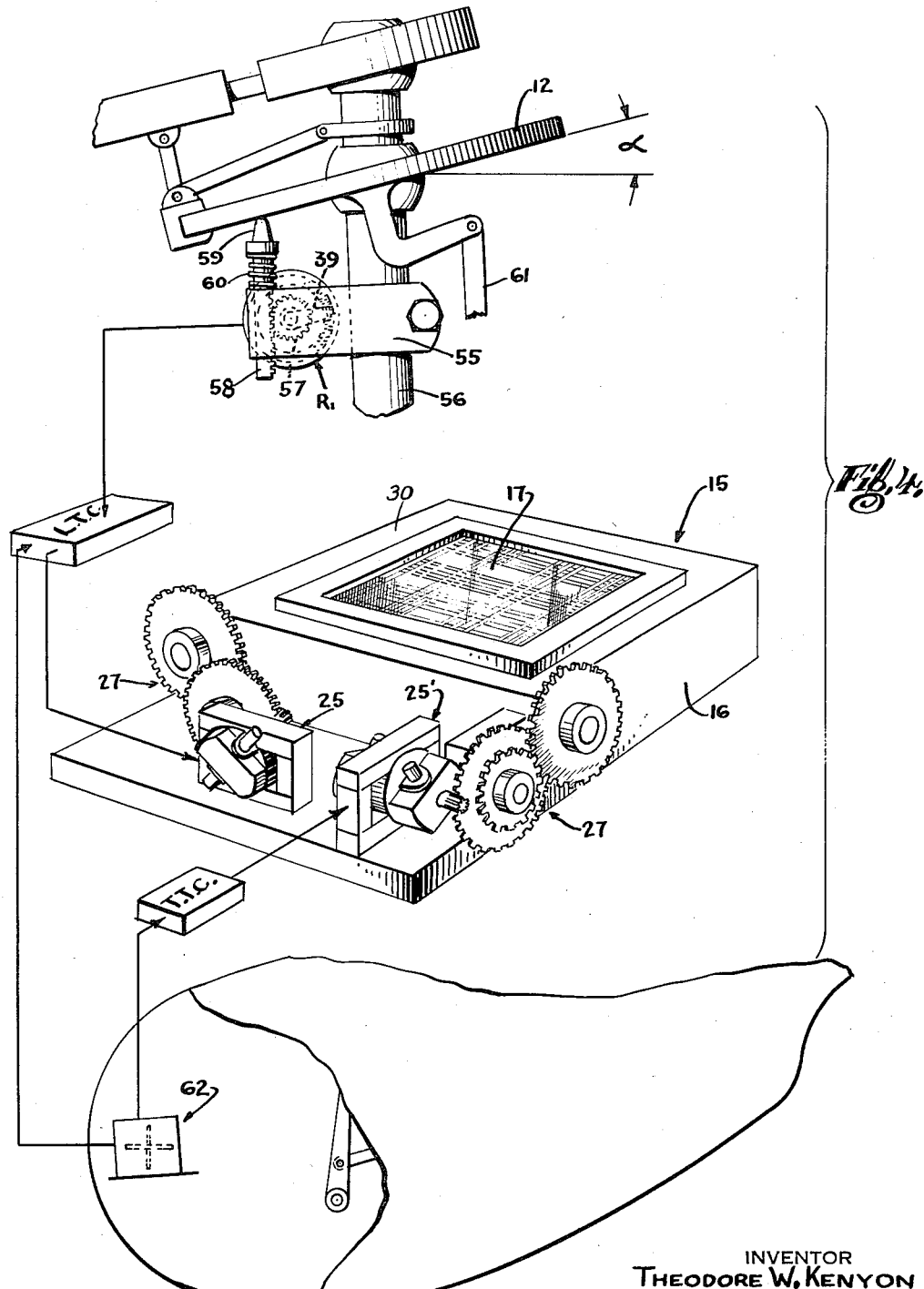

INVENTOR
THEODORE W. KENYON
BY
ATTORNEYS

Feb. 3, 1959 T. W. KENYON 2,871,699
INDICATING INSTRUMENT FOR HELICOPTERS OR THE LIKE
Filed Feb. 21, 1956 7 Sheets-Sheet 4

INVENTOR
THEODORE W. KENYON
BY Kenyon & Kenyon
ATTORNEYS

Feb. 3, 1959   T. W. KENYON   2,871,699
INDICATING INSTRUMENT FOR HELICOPTERS OR THE LIKE
Filed Feb. 21, 1956   7 Sheets-Sheet 5
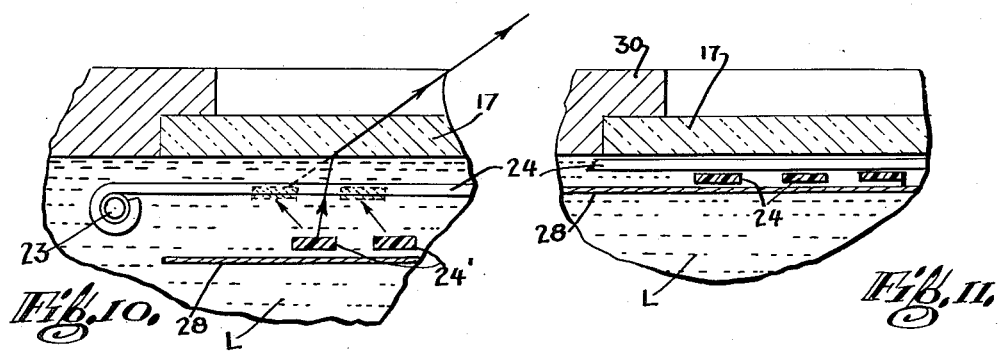
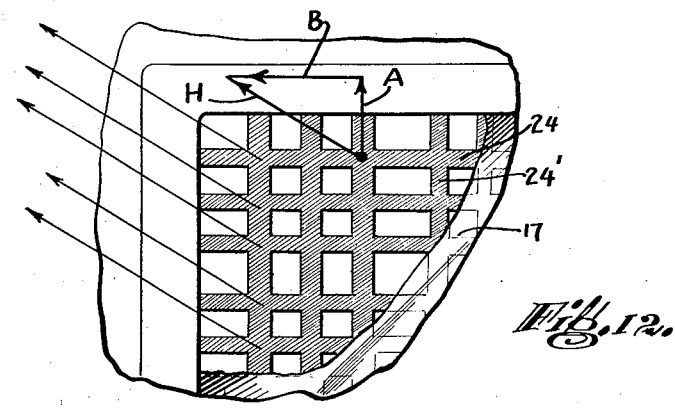
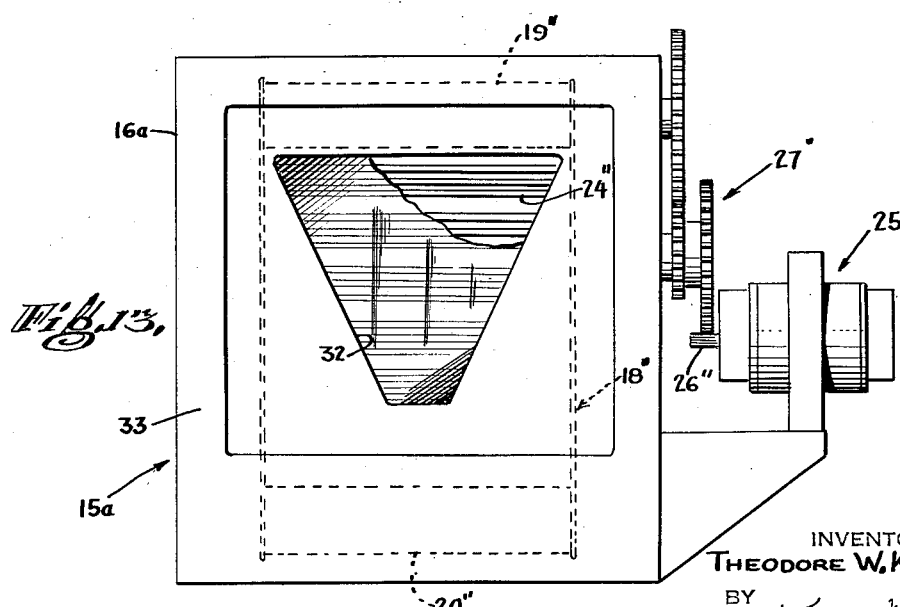
INVENTOR
THEODORE W. KENYON
BY
Kenyon & Kenyon
ATTORNEYS Feb. 3, 1959  T. W. KENYON  2,871,699
INDICATING INSTRUMENT FOR HELICOPTERS OR THE LIKE
Filed Feb. 21, 1956  7 Sheets-Sheet 6
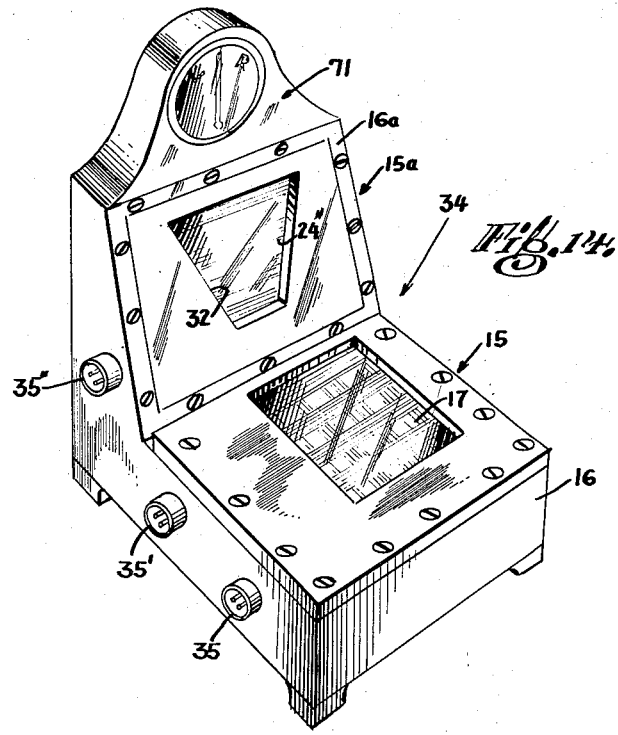
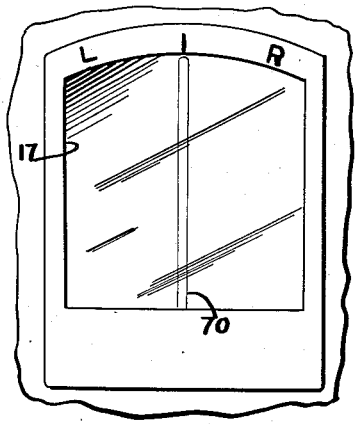
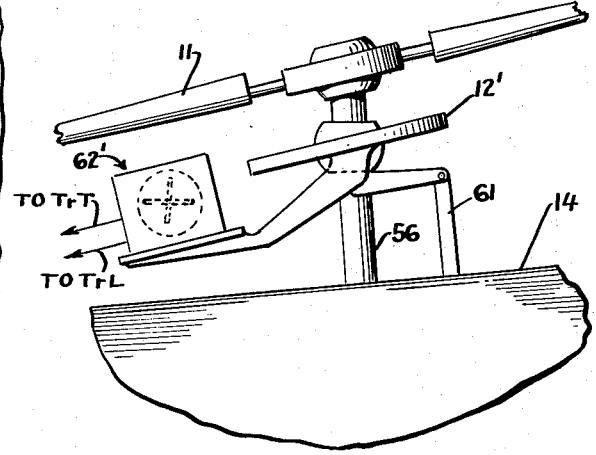
INVENTOR
THEODORE W. KENYON
BY *Kenyon & Kenyon*
ATTORNEYS

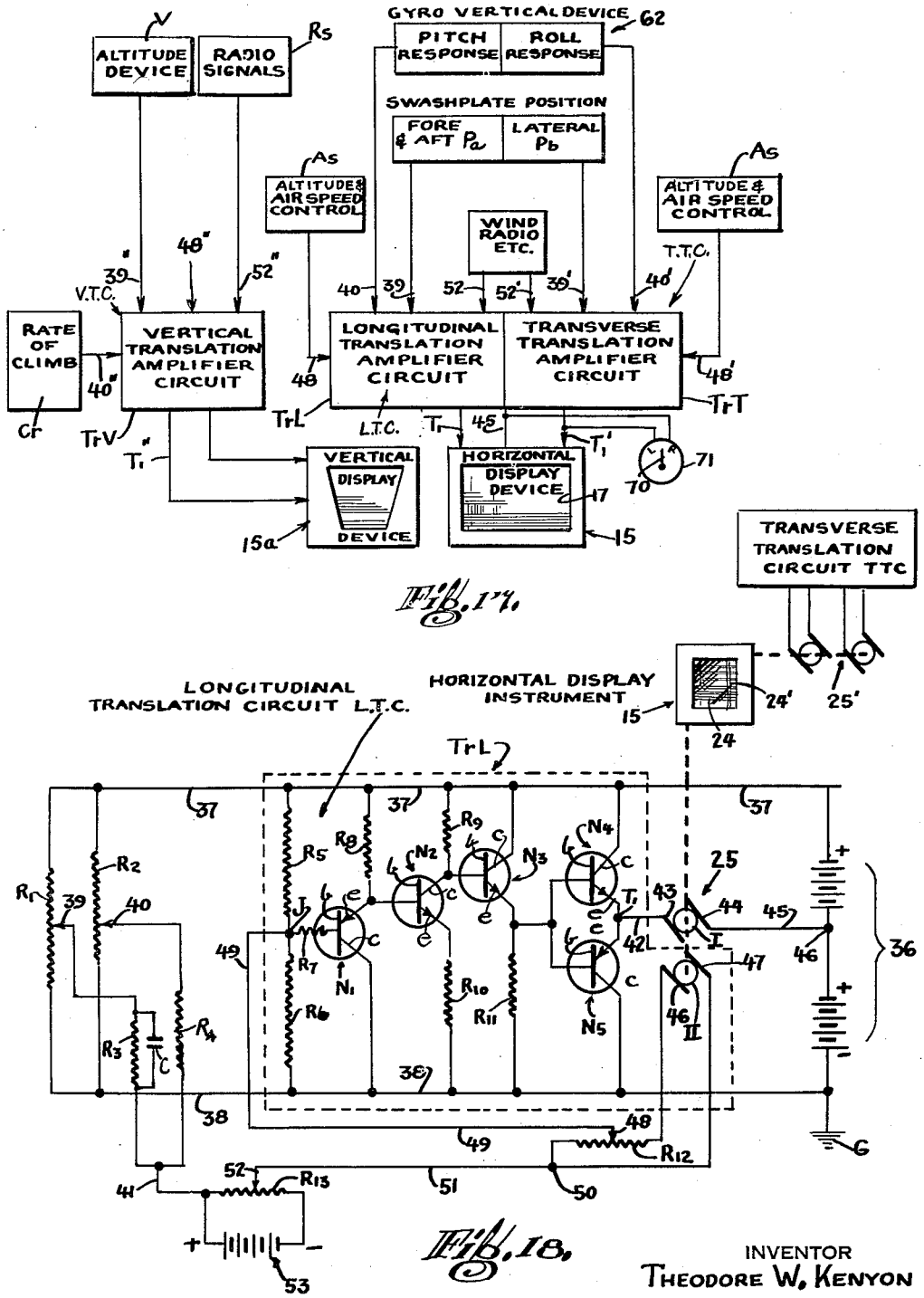

United States Patent Office 2,871,699
Patented Feb. 3, 1959

2,871,699

INDICATING INSTRUMENT FOR HELICOPTERS OR THE LIKE

Theodore W. Kenyon, Old Lyme, Conn., assignor to Kenyon Laboratories, Incorporated, Old Lyme, Conn., a corporation of Connecticut Application February 21, 1956, Serial No. 566,842

11 Claims. (Cl. 73—178)

This invention relates to indicating instruments and more particularly to translation indicating devices useful in flying helicopters or similar aeronautic devices under blind or obscured visibility conditions.

Presently it is practically impossible to fly a helicopter on instruments. As soon as visual reference is broken due to darkness, fog or clouds unless the helicopter is kept in forward motion, there is no satisfactory available instrument of which I am aware to allow the pilot to hover or to descend.

Objects and features of the present invention are the provision of indicating devices that will animately inform the pilot of what the helicopter is doing translationwise either in horizontal or vertical planes, or both, under conditions of blind flight.

Other objects and features of the invention are the provision of novel arrangements and circuits for controlling motion of the visual indicating elements of the device.

Further objects and features of the invention are the provision of a translation indicating device having moving grids which when viewed by the pilot yield an optical visualization of the actual direction and rate of translation of the helicopter, the device including control means for individual of its grids which are independently responsive to variables that affect actual translatory motion of the helicopter and whose individual responses are collated or integrated to provide the desired resultant visible motions of the grids.

Further objects and features of the invention include the provision of novel electrical drive means for the grids and associated electrical circuits for energizing said drive means.

Additional objects and features of the invention include the provision of novel means to improve visibility of the patterns resulting from movement of the grids and to eliminate confusion in their observation by the pilot by tending optically to place crossed moving grids in a common plane notwithstanding their existence and motion actually in planes at different levels.

Further objects and features of the invention include the provision of electric amplifier circuits in conjunction with the electrical drive means whose inputs and outputs may be varied by the introduction or deletion of variables as required during flight to provide translatory motion to the grid patterns of the device, observation of which grids will closely and accurately simulate what the pilot would actually see translationwise, if the ground reference were actually visible to him. The said variables might, for example, include besides swash plate and gyro vertical changes, such variables as wind speed and direction over a landing area, air speed, elevation, rate of climb and such other factors that have an appreciable effect on translatory motion in horizontal and/or vertical translation of the helicopter during flight.

Further objects and features of the invention include provision of line of flight indicating means in conjunction with the moving grid patterns to facilitate the maintenance of a fixed line of flight in a desired direction.

Still other objects and features of the invention include the provision of structure and electric circuits that are simple and easy to install and service.

Other objects and features of the invention will become apparent from the following specifications and the accompanying drawings wherein:

Fig. 1 is a perspective view of a helicopter equipped with the device of this invention showing the position of its blades and swash plate in the hovering position with the lateral and longitudinal axes of its gondola, both horizontal;

Fig. 2 is in similar view of the helicopter showing forward pitch thereof and of its gondola;

Fig. 3 is a similar view of the helicopter showing a roll position thereof and of its gondola;

Fig. 4 is an exploded perspective and partially diagrammatic view of the indicating device of the invention illustrative also of a manner of its control;

Figs. 10, 11 and 12 are fragmentary diagrammatic and partially sectional views illustrating details of construction;

Fig. 13 is an elevational view of a vertical motion indicating device or instrument embodying features of the invention;

Fig. 14 is a perspective view of a combination horizontal translation and vertical motion indicating device or instrument embodying the invention;

Fig. 15 illustrates diagrammatically an adjunct applicable to the horizontal translation device for enabling a pilot to maintain a selected directional course and line of flight;

Fig. 16 is a diagrammatic showing of a manner of utilizing a gyro device attached to the helicopter swash plate for developing signals for operating the indicating devices of this invention;

Fig. 17 is a diagrammatic illustration of circuit connections for feeding electrical information to the operational motors of the indicating instruments or devices of this invention; and Fig. 18 is a circuit diagram of the electrical connections for devices of one of the motor generator sets employed in the devices of this invention.

Figure 5:
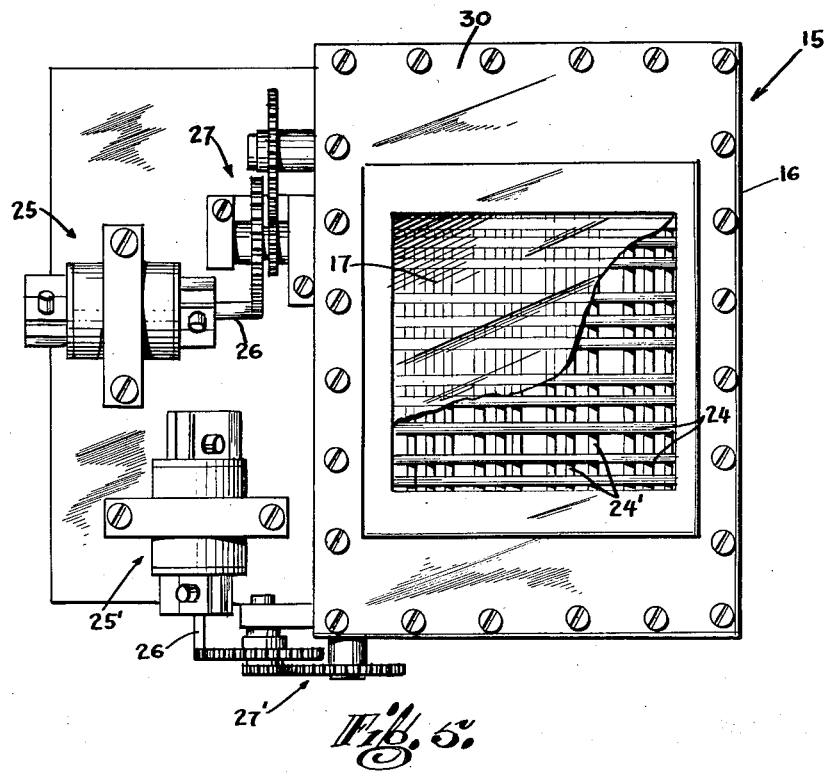
Fig. 5 is a plan view of one form of indicating instrument or device embodying the invention.
Figure 6:
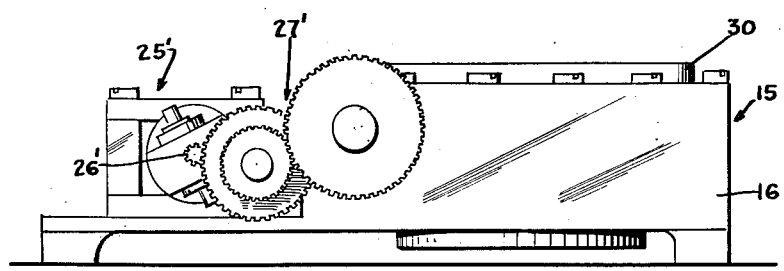
Fig. 6 is an elevational view of the device of Fig. 5.
Figure 7:
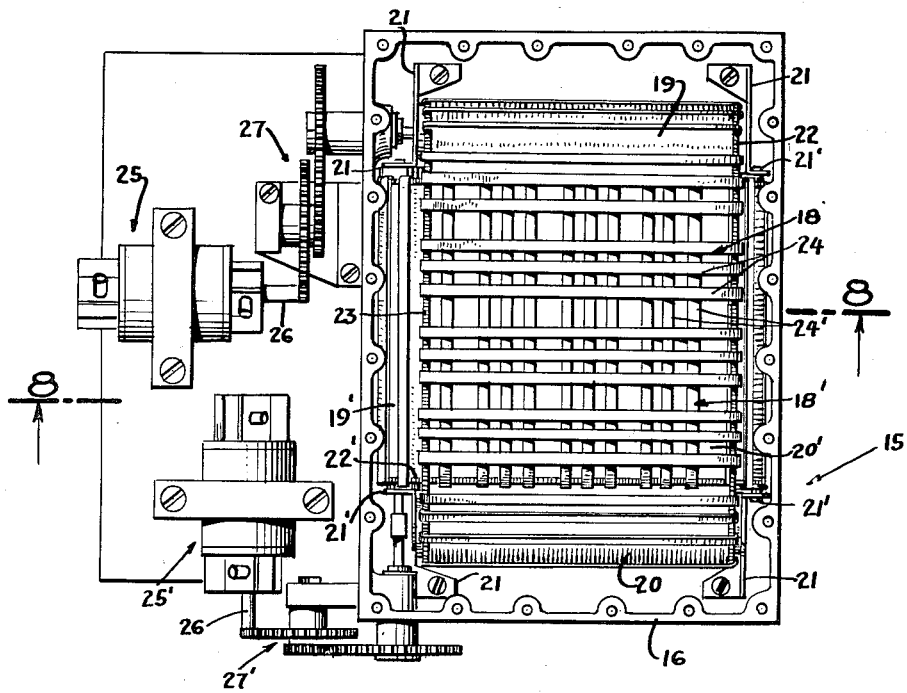
Fig. 7 is a plan view of the device of Fig. 5 with its cover panel removed.
Figure 8:
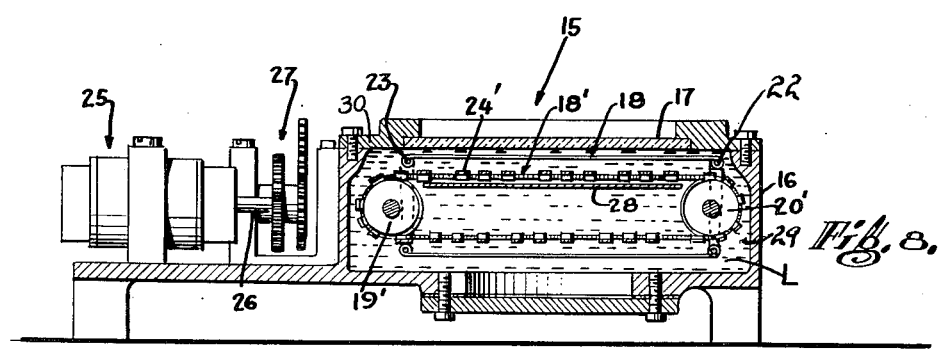
Fig. 8 is a section taken along line 8—8 of Fig. 7 and viewed in the direction of the arrows.
Figure 9:
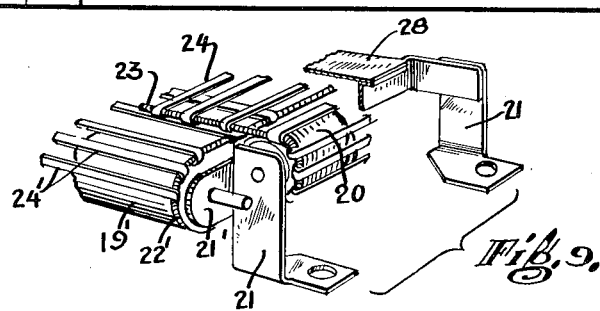
Fig. 9 is a diagrammatic perspective view of instrument details seen from the lower left hand corner of Fig. 7.

Referring to the drawings and first to Figs. 1–4, inclusive, the reference character 10 denotes a conventional helicopter having rotor blades 11 and usual controlled swash plate 12 for manipulating the blades 11 by the control stick 13 in the gyro gondola or cabin 14. As is shown, the angular deposition of the swash plate 12 determines the direction of motion of the helicopter. When the swash plate 12 is substantially horizontal, the vehicle hovers, when said plate is tilted longitudinally forward, the vehicle moves forwardly. When tilted sideways or laterally the vehicle moves sideways and when longitudinal and lateral tilts occur, directional motion is the resultant of the effects of both tilts.

In conventional flight, the tilt direction of the swash plate 12 and direction of motion of the vehicle 10 are controlled conveniently by operator manipulation of the control stick 13 in the gondola or cabin 14. It is not, however, possible at present to fly the helicopter on available instruments. As soon as visual reference is broken due to dark, fog or clouds, unless the helicopter is kept in forward motion, there is no instrumentation available to allow the pilot to hover or descend. The device or instrument of the instant invention denoted generally by the reference character 15 (Figs. 4 et seq.) is intended to be conveniently located in the pilot's cabin or elsewhere in the gondola 14 to provide the pilot with visual animate indication of what the helicopter is doing translation-wise either in a horizontal plane or in a vertical plane or in both.

In the instrument or device 15 depicted in Figs. 4–13, inclusive, a casing 16 is provided in one of whose faces a transparent window 17 is located. The casing 16 is intended to be mounted at a convenient location in the pilot's cabin so that the window 17 lies substantially horizontally. An endless belt 18 (Figs. 7 and 8) is mounted between the parallelly disposed driver roller 19 and idler roller 20 supported on appropriate brackets 21 located within the casing 16 so that the upper flight of the belt 18 will pass under the window 17 when the belt or band 18 is rotated. The belt 18, as shown, is in the form of a pair of spaced cords or small cables 22, 23 having transverse spaced bars 24 connecting the same to form slats or a "picket fence" effect when the belt 18 is revolved. A second endless belt 18' is mounted between parallelly disposed driver roller 19' and idler roller 20' which are perpendicular to rollers 19 and 20 and are carried on the brackets 21' also located within casing 16 so that its spaced bars 24' move transversely of the spaced bars 24 when belt 18' is revolved. In effect, the bars 24 and 24' are in crossed perpendicular relationship to each other with bars 24' lying below bars 24.

The driver rollers 19 and 19' for the two belts 18 and 18' are independently operated by respective motor generators 25 and 25'. The shaft 26 of motor generator 25 is coupled to driven roller 19 through a gear train 27. Similarly, the shaft 26' of motor generator 25' is coupled to driven roller 19' through a similar gear train 27'. The two independent motor generators 25 and 25' are mounted conveniently on the base of casing 16 with their shafts 26 and 26' perpendicular to each other for convenient coupling with the respective gear trains 27 and 27' to drive the respective driver rollers 19 and 19'. In the embodiment shown, the two flights of belt 18' lie between the flights of the belt 18 so that each belt may be rotated entirely independently of the other by respective driven rotation of rollers 19 and 19'.

To provide contrast for the darkly colored bars 24, 24' a lightly colored background plate 28 (Fig. 8) is suitably supported internally of the casing compartment 29 below the upper flights of both belts 18 and 18'. Moreover, to improve visibility of the bars 24, 24' through the window 17 irrespective of the angle from which viewed, and also to provide the optical illusion that all bars visible through window 17 lie in the same plane, the compartment 29 after mounting therein of the components hereinbefore described is filled with a crystal clear liquid L of high refractive index, for example, a silicone liquid commercially available as Dow Corning Silicone 200 Fluid having a viscosity of 50 centistokes. The crystal clarity and high refractive index of this liquid bring the apparent images of the cross bars viewed through window 17 to a position whereat they appear to lie in a common plane, as seen in Fig. 12, and are clearly visible by the observer irrespective of the angle from which they are view through said window. Other liquids possessing similar properties may be utilized. It is understood, of course, that the driven ends of the shafts carrying rollers 19 and 19' which extend outwardly of compartment 29 are equipped with appropriate shaft seals to prevent leakage of the liquid. Likewise, the window 17 is sealed in place by a removable cover plate 30.

The motor generator sets 25 and 25' are controlled independently as will be described and rotation of their respective shafts 26 and 26' independently causes independent rotation of the belts 18 and 18'. The bars 24 and 24' of these two bands, as previously noted, are in crossed perpendicular relationship. When these bars move with their respective bands 18 and 18', movement of bars 24 of band 18 is intended to represent longitudinal translation of the helicopter while movement of bars 24' of band 18' is intended to represent transverse translation. The visual effect when both bands are moving is a simulation of the actual horizontal translatory motion of the helicopter at the speed of and in direction of actual motion. This is illustrated diagrammatically in Fig. 12 wherein bars 24 are moving in the direction of vector A and bars 24' are moving in the direction of vector B. The resultant motion of both bars 24 and 24' which the pilot sees appears to be in the direction of the resultant vector H which is in the direction of actual horizontal translation of the helicopter and also is illustrative of the speed of translation in such direction.

The indicating instrument 15 so far described provides visual indication of translation in one plane only, for example, the horizontal. If, in addition, an indication of the extent and direction of vertical translatory motion is also desired, the added vertical reading instrument 15a of Fig. 13 is provided. Casing 16a contains a third endless band 18" of similar construction to bands 18 and 18'. The cross bars 24" of this band 18" are visible through a window 32 in the face plate 33 of casing 16a. The face plate 33 may be slanted to improve ease of viewing the cross bars 24" through its window 32. The latter, in turn, has a downwardly tapering periphery so that the cross bars 24" will appear to contract when moving downwardly and to elongate when moving upwardly. The band 18" of which bars 24" are components is rotated by a motor generator set 25" and gear train 27" of identical nature to motor generators 25 and 25' and gear trains 27 and 27' that drive bands 18 and 18'. The motor generator set 25" that drives the band of bars 24" is operated as will be described by electric circuits in such a way as to indicate direction and speed of vertical translatory motion. The casing 16a is filled with the same highly refractive fluid used for filling casing 16 and for the same purposes.

The instruments 15 and 15a may be combined into the single unit 34, as seen in Fig. 14, with window 17 of the horizontal translation indicating portion of the device in a substantially horizontal plane and with the window 32 of the vertical movement indicating portion of the device in an upwardly extending plane so that a pilot looking at both windows 17 and 32 and the moving bars 24, 24' and 24" visible therethrough will be able to receive visual indications of the magnitude and direction of horizontal translation and of vertical translation of the helicopter he is flying. The casings 16 and 16a of the unit 34 have dimensions sufficient to provide protecting envelopes for the motor generators 25, 25' and 25" and gear trains 27, 27' and 27". Electrical connectors 35, 35' and 35" are provided for appropriate connection of electric circuits to the respective motor generators 25, 25' and 25" located within said casings.

*Electric circuits*

The motor generators or sets 25, 25' and 25" are each independently connected in separate electric circuits.

For example, in Fig. 18, the electric circuit for operating the motor generator set 25 that rotates band 18 is depicted. For convenience, this circuit is hereafter called the longitudinal translation circuit LTC and includes a longitudinal translation amplifier circuit TrL. Included in these circuits are the potentiometers $R_1$ and $R_2$ each in this embodiment of approximately 2500 ohms resistance. These potentiometers $R_1$ and $R_2$ are connected in parallel across the positive and negative terminals of a 24 volt battery 36 by the positive wire 37 and the return negative wire 38, the negative wire and negative terminal of the battery 36 being grounded at G.

The movable arms 39 and 40 of potentiometers $R_1$ and $R_2$ are connected, respectively, via fixed resistors $R_3$ and $R_4$ each of ½ megohm ½ watt rating to a common wire 41, the resistor $R_3$ having a condenser C, of approximately 1 mfd. capacity shunted across its terminals. The movable arms 39 and 40 are intended to be operated independently, for example, arm 39 in response to changes in helicopter swash plate position relative to the helicopter frame or to changes in control stick position which change the disposition of the swash plate in one vertical plane and arm 40 to pitch change detected by a gyro vertical device as will be presently described. For convenience, potentiometer $R_1$ will hereinafter be designated as the swash plate potentiometer, and potentiometer $R_2$ will be designated as the pitch responsive gyro potentiometer.

Series connected resistors $R_5$ and $R_6$ both of 1 meg. ½ watt rating are connected across the wires 37 and 38 and their common input junction J is connected through a resistor $R_7$ of approximately 10,000 ohm rating to the base terminal b of an n-type point contact transistor $N_1$ identified commercially as a 2N34 transistor available commercially from Sylvania Electric Products, Inc. The collector terminal c of this transistor $N_1$ is connected to the common negative return wire 38. The emitter terminal e of the transistor $N_1$ is connected through a resistor $R_8$ of approximately 35,000 ohm rating to the positive wire 37. This emitter terminal e, likewise, is connected to the base terminal b of a p-type point contact transistor $N_2$ identified commercially by the same producer as a 2N35 transistor. The collector terminal c of this second transistor $N_2$ is connected through a resistor $R_9$ of 5000 ohm rating to the positive wire 37. Its emitter terminal e is connected through a resistor $R_{10}$ of 60 ohms rating to the negative return wire 38. Collector terminal c also is connected to the base terminal b of a second p-type point contact transistor $N_3$ identified commercially by the same source as a 2N95 transistor. The collector terminal c of this transistor $N_3$ is connected directly to positive wire 37. Its emitter terminal e is connected through the resistor $R_{11}$ of 550 ohm rating to the common negative return lead wire 38. This collector terminal e of transistor $N_3$ is also connected directly to the respective base terminals b of the two transistors $N_4$ and $N_5$ of which transistor $N_4$ is identical with transistor $N_3$. Transistor $N_5$ is an n type point contact transistor identified commercially by the same source as a 2N68 transistor. Collector terminal c of transistor $N_4$ is connected directly to positive wire 37. Collector terminal c of transistor $N_5$ is connected directly to negative return wire 38. The two emitter terminals e of the two transistors $N_4$ and $N_5$ are directly connected together, their common junction $T_1$ constituting one output terminal of the transistor amplifier circuit TrL provided by the aforementioned transistors $N_1$–$N_5$, inclusive. This output terminal $T_1$ is connected by a lead wire 42 to one motor brush 43 of a first pair of brushes for the motor armature I of the motor generator set 25. The second motor brush 44 of this pair is connected by wire 45 to the center point 46 of the battery 36 which is at 12 volts positive with respect to the ground G. The two generator brushes 46 and 47 of the second pair of armature brushes of the generator armature II of the motor generator set 25 are shunted by a potentiometer $R_{12}$ having a 2500 ohm rating. The movable arm 48 of the potentiometer $R_{12}$ which is operated, as will be presently described, is connected by wire 49 to the input junction J of the transistor amplifier circuit TrL. The terminal 50 of potentiometer $R_{12}$ which is connected also to brush 47 additionally is connected by wire 51 to the movable arm 52 of a bias adjusting potentiometer $R_{13}$ of 200,000 ohm rating which is shunted across a biasing battery 53 of approximately 15 volts. The positive terminal of biasing battery 53 is connected to the wire 41. The latter via the respective resistances $R_3$ and $R_4$ is connected to the control arms 39 and 40 of the respective potentiometers $R_1$ and $R_2$.

With this circuit arrangement LTC including its transistor amplifier system TrL, the speed and direction of rotation of the shaft 26 of motor generator set 25 and also in consequence via gear train 27, those of the belt 18 are functions of, at least, four variables, namely, the particular positions of movable arms 39, 40, 48 and 52 of the respective potentiometers $R_1$, $R_2$, $R_{12}$ and $R_{13}$. Initially, substantially centralized positions of all four arms on their respective potentiometers provides a balanced or static condition in the motor generator set 25 such that its shaft 26 is stationary. Any change or shift of one or more of these four arms will upset this balance and cause rotation of shaft 26 in a direction and at a speed which are consonant with the polarity and voltage then appearing across the amplifier output terminals $T_1$ and 46, which energizes the motor brushes 43 and 44 of motor brush pair I. It is to be noted in this respect, however, that the generator output delivered to brushes 46 and 47 of generator brush pair II has an interacting effect on the resultant amplifier output appearing between terminals $T_1$ and 46 because part of the generator output is fed from potentiometer $R_{12}$ via wire 49 to amplifier input terminal J. The shaft 26 is thus highly sensitive in its response to any circuit unbalance resulting from a change in any one of at least four variables and substantially no time lag exists between occurrence of the change and the appropriate rotative response of shaft 26 thereto. Since net motion of shaft 26, at any time, is transmitted via gear train 27 to the driving drum or roller 19 of band 18, motion of band 18 is similarly sensitive and responsive to changes in the aforementioned variables. In consequence, the cross bars 24 of band 18 move across the field of vision through window 17 in extremely sensitive response to the driving motion of shaft 26. While amplifier circuit TrL is herein described as a transistor type amplifier with specific types of transistors, the said circuit may utilize different types of transistors with necessary circuit and component changes. It also, if desired, may be replaced by like acting electronic tube amplifier circuits.

In the embodiment shown in Fig. 5, this bar (24) motion is longitudinally across the face of window 17. This motion is in a direction that simulates forward and rearward motions in a horizontal plane of the helicopter in which the instrument is carried. The specific forward or rearward movement and speed thereof depend upon the direction and speed of rotation of motor generator shaft 26.

The control movements of arm 39 of swash plate potentiometer $R_1$ may be effected in response to angular changes α (Fig. 4) of the swash plate 12 relative to the helicopter frame in fore and aft direction of the helicopter in any convenient way. For example, as shown in Fig. 4, the potentiometer $R_1$ is supported by a bracket 55 from the rotor blade support post 56 of the helicopter. The movable arm 39 is coupled in conventional manner to a gear 57. This gear 57 meshes with a vertically disposed and movable spring-biased rack 58 carried by the bracket 55 so that its nose 59 is maintained in contact with the under surface of swash plate 12 by biasing spring 60. Thus, any angular change α of the swash plate 12 in fore and aft direction relative to the helicopter from the control stick through a coupling 61 will cause corresponding longitudinal movement of rack 58 and corresponding rotation in appropriate direction of potentiometer arm 39. The coupling is set so that in initial or neutral position of the swash plate 12, the potentiometer arm 39 lies at the half-way or center point of the resistance of the potentiometer $R_1$. Instead of operating the arm 39 directly from the swash plate it may be similarly operated by connection directly with the control stick.

The pitch control movements of arm 40 of gyro vertical potentiometer $R_2$ may be effected in response to angular pitch departures from vertical in a fore and aft plane of any conventional gyro vertical device 62. The latter may, for example, provide electric power to drive an arm operating motor (not shown) that will move the arm 40 of potentiometer $R_2$ in desired direction and extent. In the alternative, the gyro vertical may provide mechanical coupling between it and the arm 40 to effect responsive movement of the latter. Gyro vertical devices of both such types are well known and selection of the particular type to use is optional.

In some cases, as illustrated in Fig. 16, the gyro vertical device 62' can be supported by a bracket 63 which is fastened directly to the swash plate 12'. In such event the arms 39 and 39' of the potentiometers $R_1$ and $R_1'$ are set manually to a central or circuit balancing position and the potentiometer arms 40 and 40' of the pitch and roll controls of the gyro vertical alone are activated thereby to provide input control for the amplifier circuits TrL and TrT.

Movable arm 48 of generator shunting potentiometer $R_{12}$ may be controlled manually, or automatically in any conventional way in response to signals representative, for example, of altitude and air speed. The same motive power utilized to operate an altitude device and/or air speed indicator $A_s$, Fig. 17, of any conventional type may be supplied to receptive mechanism of known types coupled electrically or mechanically to the arm 48 of potentiometer $R_{12}$ to move it correspondingly over the resistance of said potentiometer $R_{12}$ for purposes presently to be described.

The control movements of arm 52 of the biasing potentiometer $R_{13}$ may be effected manually or by a conventional automatic means (not shown) activated in response, for example, to radio signals of information such as wind direction or of other flying data, or factors whose variability has an appreciable effect on actual flight of the helicopter.

The actual speed and fore or aft directional motion of the cross bars 24 across the face of window 17 at any instant is that caused by the particular output voltage across the terminals $T_1$ and 46 at substantially that time, this output voltage being the combined effect in the amplifier circuit TrL of the immediate independently adjusted positions of the potentiometer control arms 39, 40, 48 and 52 and the action of the generator of the motor generator set 25.

An identical circuit to that just described and identified as a transverse translation circuit denoted generally by the reference letters TTC and including an amplifier circuit TrT is provided to operate the motor generator set 25' whose shaft 26' through gear train 27' rotates the band 18' carrying bars 24' and moves them translationwise transversely across the face of window 17. Every component of transverse translation circuit TTC is identical with its corresponding component in the longitudinal translation circuit LTC described in detail above. Its swash plate potentiometer arm 39' (Fig. 17) (corresponding to arm 39 of potentiometer $R_1$) is operated, however, in response to angular changes of the swash plate in the transverse direction rather than to those in longitudinal plane. Similarly, the cam 40' of its gyro vertical roll responsive potentiometer (corresponding to arm 40 of pitch potentiometer $R_2$) is operated in response to gyro vertical roll changes rather than to pitch changes. Its potentiometer arms 48' and 52' that correspond to the arms 48 and 52 of potentiometers $R_{12}$ and $R_{13}$ are responsive to the same information as the latter or to any other needful information regarded necessary to affect the transverse motion of cross bars 24' in accurate simulation of the lateral or transverse horizontal translation of the helicopter.

In cases where only the horizontal display instrument or device 15 of Figs. 4–12, inclusive, is utilized employing only the two crosswise movable bands 18 and 18' which are intended to give visual indication only of actual horizontal translation of the helicopter, only the two circuits LTC and TTC are required. In the event, however, that the additional vertical display arrangement 15a of Fig. 13 is also utilized, as in the instrument 34 of Fig. 14, an additional vertical translation circuit VTC (Figs. 13–17) is provided. This circuit VTC may be identical in its components including an amplifier circuit TrV with corresponding components of the longitudinal translation circuit LTC described in detail above. Its potentiometer arm 39'' (Fig. 17) (corresponding to arm 39 of potentiometer $R_1$) is adjusted in response to signals from or operational movements of any conventional altitude device V. Similarly, the arm 40'' of its potentiometer (corresponding to arm 40 of potentiometer $R_2$) is adapted to move in response to signals or operational movements of any conventional rate of clime sensing device $C_r$. Its potentiometer arm 48'' (corresponding to arm 48 of potentiometer $R_{12}$) may be manually adjusted to a midway balancing position and left at such adjustment. Similarly, its potentiometer arm 52'' (corresponding to the arm 52 of biasing potentiometer $R_{13}$) may be operated by desired informational radio signals in the same way as arm 52 of said potentiometer $R_{13}$.

The schematic diagram of the entire operating system is shown in Fig. 17. In that figure, the horizontal display device is denoted by its reference character 15, while the vertical display device is denoted by its reference character 15a. As hereinbefore described, the horizontal display device includes a longitudinal translation circuit LTC and a transverse translation circuit TTC. These two circuits, as previously mentioned, are identical electrically including the transistor amplifiers TrL and TrT whose inputs are controlled by the movable arms 39 and 39', 40, 40', 48, 48', 52, 52' of their respective sets of potentiometers. Arm 39 is controlled by mechanism $P_A$ that as described is responsive to fore and aft angular positional changes of the swash plate. Arm 39', likewise, is controlled by a similar mechanism $P_b$ and is moved responsively thereby in accord with lateral angular positional changes of the swash plate. Arm 40 is moved responsively to pitch signals from the gyro vertical device 62. Arm 40' is moved responsively to roll signals from said gyro vertical device. Arm 48' is moved responsively to altitude and air speed or altitude only or other signals from device $A_s$. Arm 48 may be moved similarly. Arms 52 and 52' are each moved responsively to wind, radio or other signals. The outputs from each of the amplifiers TrL and TrT are regulated independently as a result of responsive movements of their potentiometer arms 39, 40, 48, 52 and 39', 40', 48' and 52' and provide independent drives for respective shafts 26 and 26' that drive the respective longitudinal and laterally movable bands 18 and 18' with corresponding longitudinal and transverse movements of their respective cross bars 24, 24' past window 17. The optical effect of these combined bar movements is an appearance of motion of the bars in actual direction of horizontal translation at substantially the speed of such translation thus giving the pilot a visual indication in the gondola 14 of the true translatory motion of the helicopter, irrespective of the positional angle of said cabin or gondola. The altitude control of arm 48 of rheostat $R_{12}$ in the TrL amplifier circuit and of arm 48' of the corresponding rheostat in the Trt amplifier circuit tends to make the patterns of the cross bars 24 and 24' of the bands 18 and 18' go faster when the helicopter is near the ground and slower at higher altitudes with otherwise the same input signals to the two amplifier circuits. This very important effect gives the pilot an indication that he is high or low merely by the sensation derived from observing the moving pattern, in the same manner as would direct observation of the ground itself which seems to move much faster with a given control on the helicopter at low altitudes than at high altitudes. The intended effects of the altitude devices $A_s$ on movement of the potentiometer arms 48 and 48' can, of course, be regulated, as desired.

In addition, if the vertical altitude display device 15a is included, its transistor amplifier TrV which is identical with the other transistor amplifiers TrL and TrT has its movable potentiometer arms 39″, 40″, 48″ and 52″ operated, respectively, by the altitude measuring device V, the rate of climb sensing device $C_r$ and radio signals source $R_s$ of desired kind and such other informational devices as may be required. The output at $T_1''$ serves to operate the movable band 18″ and its bars 24″ of the vertical display device 15a vertically across the window 32 of said device 15a at a speed of and in the direction of vertical translatory motion of the helicopter vehicle.

A helicopter equipped with the horizontal and vertical translation display devices 15 and 15a of this invention will enable the pilot to fly the helicopter in "blind" weather conditions because observation of the bars 24 and 24' of the horizontal display device 15 will give him information of his horizontal translation and observation of the bars 24″ of the vertical display device 15a will give him information as to his vertical translation.

As an optional adjunct to the arrangements described, a zero center galvanometer of the voltmeter type may be mounted internally of the casing 16, as seen in Fig. 15, so that its indicator arm 70 is visible through window 17 and normally centered relative to a "0" index mark. This voltmeter is connected in electrical parallel across the output $T_1'$ and wire 45 of the amplifier TrT (Fig. 17) that operates the transversely moving bars 24' of the horizontal display device. The indicator arm 70 swings to right or left of the index mark depending upon magnitude and polarity of the output voltage appearing across terminals $T_1'$-45. By manipulating the control stick 13 to maintain a zero reading of indicator arm 70, the pilot is able to maintain a fixed line of flight. This indicating voltmeter adjunct can be mounted as a separate entity 71 at any convenient location, for example, at the top of the vertical display device 15a, as shown in Fig. 14, or elsewhere in the cabin or gondola 14 of the helicopter in a location where it may be readily observed by the pilot.

*Operation*

During flight, particularly under blind flying conditions, observation by the pilot of the cross bars 24, 24' and 24″ will enable him to ascertain the direction and speed of his actual translatory motion. It is then merely necessary for him to manipulate the control stick 14 in such compensating directions as are needed to alter the speeds and direction of motion of desired ones of respective moving cross bars. The positional changes of the control stick 14 provide corresponding positional changes of the swash plate 12 and, in consequence, of the arms 39, 39' of potentiometers $R_1$ and $R_1'$. The gyro vertical 62 also is responsive to departures from vertical resulting from flight and from such control stick manipulations and, in consequence, imparts appropriate corrective motions to the arms 40 and 40' of the respective potentiometers $R_2$ and $R_2'$. At the same time the potentiometer arms 48, 48', 52 and 52' are manually moved or automatically operated in response to receipt of additional information such as of altitude, air and wind speeds and directions and of other radio signals and affect the movement of cross bars 24 and 24' through amplifiers TrL and TrT in the manner described. Similarly, the potentiometer arms 39″, 40″, 48″ and 52″ are operated by altitude changes, rate of climb or descent and of radio signals of other necessary information to influence movements of cross bars 24″ in the manner described. In addition, the position of the "0" reading galvanometer arm 70, if the device includes it, is observed by the pilot and corrective motions are imparted to the control stick, if desired, to maintain a zero reading and thus a specific line of flight.

The provision of translation indicating instruments of this invention provides a solution for the problem of flying helicopters or the like under blind flying conditions in a simple and effective manner.

The invention also contemplates the adding of rates by means of the condenser C of approximately 1 mfd. capacity which is in series with the movable arm 39 of the potentiometer $R_1$ and of a similar condenser in series with the movable arm 39' of the corresponding potentiometer in the transverse translation circuit TTC. These condensers C in cooperation with the arms 39 and 39' provide RC networks, i. e. an electrical rate circuit in the swash plate position control arrangements, which is adjusted electrically so as to advance the motion of the grid patterns of bars 24 and 24' in such a manner that over-controlling or hunting will be completely eliminated. One of the hazards of hovering is possible violent swing of the gondola as a result of overcontrolling. This swing may become accumulative to the point of wrecking the helicopter. The addition of the RC networks constituting the rate circuit described eliminates this hazard. A mechanical rate system could, of course, be used if desired.

The provision of the potentiometers like $R_{12}$ in the amplifier circuits, as well as of biasing potentiometers like $R_{13}$, whereby altitude, and also radio reception of information such as wind, speed and direction over a landing area may be used to appropriately operate the potentiometers either manually or automatically to affect the translatory movement of the grid bars 24, 24', 24″ is important. With such arrangements the radio received information can be fed into the TrL, TrT and TrV amplifier circuit inputs as needed by appropriate manual or automatic setting of the arms of said potentiometers. The pilot then can manipulate the control stick 14 to maintain the pattern of bars 24 and 24' of the horizontal translation indicator 15 stationary and under such conditions know that he will descend vertically even though there is considerable motion of the helicopter through the air to compensate, for example, for wind, speed and direction.

Moreover, as previously described, the important effect of the altitude devices $A_s$ on the arms 48 and 48', respectively, of potentiometer $R_{12}$ in amplifier circuit TrL and of its counterpart in amplifier circuit TrT provide a speed control of the moving patterns of cross bars 24 and 24', such that they tend to move faster at low altitudes than at high altitudes in simulation of how the ground would appear to the pilot to move at low and high altitudes with a given control action on the helicopter. The altitude devices $A_s$ thus affect importantly the electric amplifier circuits and thus the speed of movement of the pattern means as a function of the altitude whereby the pattern means will move at faster speed at lower elevations than at higher ones for given control operations of the helicopter for the reasons specified.

While the endless bands with their cross bars have been described as independently driven by the electrically controlled operation of the gear trains by motor generators, these bands may be driven in other suitable ways, for example, pneumatically or hydraulically with the control of the pneumatic or hydraulic drives of the bands regulated by the output from the respective amplifier systems TrL, TrT and TrV. As a further alternative the outputs of the amplifier systems TrL, TrT, TrV may be connected to create image patterns on the screen or screens of one or more cathode-ray tubes that will resemble the images seen by the pilot as a result of the movements of the bands and bars, as hereinabove described, or provide patterns on such screen or screens that will give the pilot the same type of information as that given by viewing of the bars of the moving bands. Arrangement, likewise, may be made, if desired, to project optical images of the needed information giving patterns in conventional ways.

While specific embodiments of the invention and manner of its use have been described and shown variations

What is claimed is:

1. In combination with a helicopter having a swash plate, a translation indicator instrument for providing visual simulation of translatory movement of the helicopter comprising an endless band having indicia, a motor generator set for moving said band, an electric circuit including both the motor and the generator of said set and providing connections such that output from the generator of the set may be delivered to affect drive of the motor of said set for controlling the movement of said band and means for varying electric input to said circuit as a function of swash plate position with reference to vertical.

2. In combination with a helicopter having a swash plate, a translation indicator instrument for providing visual simulation during blind flight conditions of translatory motion of said helicopter comprising an endless band provided with indicia, a motor generator set for moving said band, and electric circuit including both the motor and generator of said set for controlling the movement of said band, amplifier means in said circuit, means for delivering output from the generator as input to said amplifier means to affect drive of the motor of said set, and additional means in said circuit to modify amplifier input as a function of swash plate position with reference to vertical in control operations of the swash plate during flight whereby observation of the indicia will impart visual information regarding translatory motion of the helicopter to the observer.

3. In combination with a helicopter having a swash plate, a translation indicating instrument of the character described for providing visual simulation of translatory motion of the helicopter comprising a pair of endless bands each having indicia and being movable in crossed relationship to each other, independent motor generator sets for moving the respective bands, separate electric circuits respectively including the motor and generator of a different one of the sets and each providing connections such that output from the generator of the set associated with each circuit may be delivered to affect drive of the motor of such set for independently controlling the movement of the respective bands, and independent means in each electric circuit for varying the respective inputs to said separate circuits each as a function of swash plate position with reference to vertical in a pair of different planes.

4. In combination with a helicopter having a swash plate tiltable with reference to vertical in fore and aft and lateral planes, a translation indicating instrument for providing visual simulation of fore and aft and lateral translatory motion of the helicopter comprising a pair of endless bands each provided with indicia and movable in crossed relationship to each other with one of the bands serving to simulate fore and aft translatory motion and the other serving to simulate lateral translatory motion, independently operated motor generator sets for moving the respective bands and their indicia, separate electric circuits respectively including the motor and generator of a different one of the sets for independently controlling movements of different ones of the bands, separate amplifier means in each circuit, means in each circuit for delivering output from the generator of the set associated with such circuit as input to the amplifier means in such circuit so as to modify amplifier input to each circuit as a function of generator output and additional independent means in the circuits to modify amplifier inputs in such circuits respectively as functions of fore and aft and lateral swash plate positions with reference to vertical in control operations of the swash plate during flight whereby observation of the indicia will impart visual information to an observer regarding all translatory motion occurring in a substantially horizontal plane.

5. In combination with a helicopter having a swash plate whose angular disposition affects translatory motion of the helicopter, a translation indicator instrument for providing visual simulation of fore and aft and lateral translatory motion of the helicopter, comprising a pair of independently movable crossed endless bands each having indicia to provide indication of horizontal translatory motion of said helicopter, a separate band having indicia and being movable in substantially vertical direction to provide indication of vertical translatory motion of the helicopter, motor generator sets, each having a driven shaft, coupling means between each shaft and a different band for effecting independent driven motions of the respective bands in response to driven rotation of the shaft coupled thereto, separate electric circuits each including the motor and generator of a different motor generator set and an independent amplifier for providing separate amplifier outputs to drive different ones of the respective shafts at speeds determined by respective amplifier inputs, means to modify each amplifier input as a function of the output of the generator in the respective circuit and additional means in each of the circuits to modify the amplifier inputs independently in response to flight conditions occurring as functions of swash plate angular disposition relative to vertical by pilot controlled manipulations of the swash plate.

6. In combination with a helicopter having a swash plate tiltable by the pilot into fore and aft and lateral planes with reference to the vertical, a translation indicating instrument of the character described for providing visual simulation of fore and aft and lateral translatory motion of the helicopter comprising a pair of endless bands each having indicia and being movable in crossed relationship to each other, independent electric means for rotating the respective bands independently at speeds that are functions respectively of the fore and aft and lateral tilts of the swash plate relative to vertical, and zero reading galvanometer means in electrical parallel connection with one of said independent electric means, maintenance of the zero reading of which serves as a visual indication of movement along a specific line.

7. In combination with a helicopter having a swash plate tiltable by the pilot to different positions relative to vertical for effecting flight control, a translation indicating instrument of the character described for providing visual simulation of translatory motion of the helicopter, comprising a casing, a window therein, a pair of endless bands each having indicia and being movable in crossed relationship at different levels past said window, independent electric circuit means for moving the bands separately in response to swash plate tilts in different planes and as functions of the extents of tilts in such planes with respect to vertical and highly refractive means in the casing to cause the optical illusion of co-planar location of the portions of the bands that are visible through the window.

8. In combination with a helicopter having a swash plate tiltable by the pilot to different positions relative to vertical for effecting flight control, a translation indicator instrument for providing visual simulation for translatory flight motion, comprising movable pattern means, means for effecting movement of the pattern means to simulate translatory motion of the helicopter, an electric circuit responsive as a function of swash plate tilt relative to the vertical in control operations of the swash plate during flight for activating said pattern movement effecting means, and means responsive to altitude also to affect the electric circuit and the speed of movement of the pattern means as a function of altitude whereby the pattern means will move at faster speed at lower elevations than at higher ones for given control operations of the swash plate.

9. The combination according to claim 8 including electric rate means for affecting said circuit to advance the pattern motion and eliminate the possibilities of overcontrolling or hunting during control operations of the swash plate.

10. In combination with a helicopter having a movable swash plate for controlling its translatory motion, a translation indicating instrument positioned within the helicopter for providing visual simulation to the pilot of the translatory motion of the helicopter relative to the ground, said instrument comprising an endless band having indicia, a motor generator set for driving said band, an electric circuit including said motor generator set and connections whereby output of the generator affects the drive of the motor of the set, and independent means in said circuit responsive to positions of said swash plate relative to vertical during flight to vary electric input and output of said circuit as a function of swash plate position relative to vertical and thereby to provide corresponding changes in driving operation of said endless band by said motor generator set.

11. In combination with a helicopter device having a swash plate, and a gyrovertical device responsive to positional changes of said swash plate, and a translation indicating device, comprising an endless band having indicia, a motor generator set for moving said band, an electric amplifier circuit having its output connected to said motor generator set for driving the motor thereof, a potentiometer connected to the generator of said set and to the input of said amplifier circuit to provide adjustable variation of input to said amplifier as a function of altitude and air speed, independent means responsive to the gyrovertical device detected positional changes of the swash plate for varying the input to said amplifier circuit and independent means responsive to radio received signals for also varying the input to said circuit whereby the net movement of said band by said motor generator set is a function of the net output of said amplifier circuit.

References Cited in the file of this patent

UNITED STATES PATENTS

| | | |
|---|---|---|
| 2,001,683 | Jackman | May 14, 1935 |
| 2,105,598 | Hubbard | Jan. 18, 1938 |
| 2,130,224 | Boykow | Sept. 13, 1938 |
| 2,218,929 | Kenyon | Oct. 22, 1940 |
| 2,318,153 | Gilson | May 4, 1943 |
| 2,395,351 | Sohn | Feb. 19, 1946 |
| 2,531,492 | Angst | Nov. 28, 1950 |
| 2,567,212 | Klopp et al. | Sept. 11, 1951 |
| 2,695,143 | Andrix | Nov. 23, 1954 |
| 2,738,497 | Harland | Mar. 13, 1956 |